United States Patent
Muschett et al.

(10) Patent No.: US 11,537,918 B2
(45) Date of Patent: Dec. 27, 2022

(54) SYSTEMS AND METHODS FOR DOCUMENT SIMILARITY MATCHING

(71) Applicant: Florida Power & Light Company, Juno Beach, FL (US)

(72) Inventors: Brien H. Muschett, Palm Beach Gardens, FL (US); Jason Richard Rocco, Palm Beach Gardens, FL (US); Gillis T. Melancon, III, Jupiter, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 274 days.

(21) Appl. No.: 16/934,354

(22) Filed: Jul. 21, 2020

(65) Prior Publication Data
US 2022/0027748 A1  Jan. 27, 2022

(51) Int. Cl.
*G06F 17/00* (2019.01)
*G06N 5/04* (2006.01)
(Continued)

(52) U.S. Cl.
CPC .............. *G06N 5/04* (2013.01); *G06F 16/285* (2019.01); *G06F 16/93* (2019.01); *G06F 40/205* (2020.01);
(Continued)

(58) Field of Classification Search
CPC ........ G06N 5/04; G06N 20/00; G06F 16/285; G06F 16/93; G06F 40/205; G06F 40/30
(Continued)

(56) References Cited

U.S. PATENT DOCUMENTS

| | | | | |
|---|---|---|---|---|
| 7,089,226 B1 * | 8/2006 | Dumais | ................... | G06F 16/35 707/999.102 |
| 8,315,849 B1 * | 11/2012 | Gattani | ................ | G06F 40/295 704/10 |
| 8,954,440 B1 * | 2/2015 | Gattani | ................... | G06F 16/93 707/738 |

(Continued)

OTHER PUBLICATIONS

Desai, 'Program Synthesis using Natural Language', 2016 IEEE, ACM 38th International Conference on Software Engineering (Year: 2016).*

*Primary Examiner* — Stephen S Hong
*Assistant Examiner* — Matthew J Ludwig
(74) *Attorney, Agent, or Firm* — Tarolli, Sundheim, Covell & Tummino LLP

(57) ABSTRACT

In some examples, a document can be received and parsed to identify sentences of the document. A plurality of domain natural language classifiers (NLCs) trained based on domain training data associated with a respective domain of a plurality of domains can be programmed to classify each identified sentence to determine a sentence confidence score for each identified sentence. A plurality of document confidence scores for the document can be determined based on sentence confidence scores determined by the plurality of domain NLCs. Each document confidence score can characterize a relevance of the document to the respective domain of the plurality of domains. Document similarity data identifying at least one document among documents associated with a corresponding domain of the plurality of domains can be generated based on an evaluation of the document confidence scores for the given document and document confidence scores for the documents associated with the corresponding domain.

19 Claims, 4 Drawing Sheets

(51) Int. Cl.
   *G06F 16/93*      (2019.01)
   *G06F 16/28*      (2019.01)
   *G06F 40/205*     (2020.01)
   *G06Q 10/10*      (2012.01)
   *G06F 40/30*      (2020.01)
   *G06N 20/00*      (2019.01)

(52) U.S. Cl.
   CPC ............ *G06F 40/30* (2020.01); *G06N 20/00* (2019.01); *G06Q 10/10* (2013.01)

(58) Field of Classification Search
   USPC .............................. 715/254, 256; 706/12, 45
   See application file for complete search history.

(56)            References Cited

U.S. PATENT DOCUMENTS 10,282,419  B2       5/2019  Hebert et al.
   10,417,285  B2 *     9/2019  Allen .................... G06N 5/022
   2009/0138462 A1 *    5/2009  Bhide ................ G06F 16/3344
                                                        707/999.005
   2018/0039695 A1 *    2/2018  Chalabi .................. G06N 5/022
   2018/0233143 A1 *    8/2018  Papangelis ............. G10L 15/16
   2019/0164062 A1      5/2019  Moura et al.
   2019/0221204 A1 *    7/2019  Zhang .................... G06N 3/08
   2019/0354595 A1 *   11/2019  Sabharwal ............ G06F 16/285
   2019/0361977 A1     11/2019  Crudele et al.
   2020/0020000 A1 *    1/2020  Guy ................ G06Q 30/0282
   2020/0065387 A1 *    2/2020  Matthews ............. G06F 3/0484
   2020/0073890 A1 *    3/2020  Shamos ................ G06F 16/316
   2020/0111023 A1 *    4/2020  Pondicherry Murugappan ..........
                                                        G06Q 10/0631
   2020/0159738 A1 *    5/2020  Mutalikdesai .... G06F 16/24575
   2020/0294654 A1 *    9/2020  Harzig .................. G16H 50/20
   2021/0056261 A1 *    2/2021  Sullivan ............... G06Q 50/184
   2021/0104234 A1 *    4/2021  Zhang .................. G10L 15/197
   2022/0172269 A1 *    6/2022  Shan ................ G06Q 30/0201

* cited by examiner

SYSTEMS AND METHODS FOR DOCUMENT SIMILARITY MATCHING

TECHNICAL FIELD

This disclosure relates to systems and methods for document similarity matching. More specifically, this disclosure relates to the use of domain-trained natural language classifiers (NLCs) for identifying relevant documents.

BACKGROUND

Determining a similarity between documents provides many benefits, such as an ability to identify relevant information more efficiently when compared to manual document comparison techniques. To identify similar documents a checksum technique can be employed to determine an identicalness of documents, such as by using a message digest algorithm (e.g., MD5) or a cyclic redundancy check hashing algorithm. The similarity between documents can also be determined by analyzing and evaluating a form of words within the documents referred to syntactic similarity, which can be used to identify plagiarized documents. In some examples, similar documents can be identified using conceptual semantics, and thus based on a likeness or meaning or semantic content of text (e.g., words, sentences, etc.). Semantic similarity can be estimated by establishing a topological similarity, by using ontologies to define the distance between terms and/or concepts.

SUMMARY

This disclosure relates to systems and methods for document similarity matching. One example relates to a non-transitory machine-readable medium having machine-readable instructions. The machine-readable instructions in response to being executed by a processor can cause the processor to parse a given document to identify sentences and provide each identified sentence to each of a plurality of domain NLCs to classify each identified sentence to determine a sentence confidence score for each identified sentence of the given document. Each domain NLC can be trained based on domain training data associated with a respective domain of a plurality of domains. The machine-readable instructions can further cause the processor to determine a plurality of document confidence scores for the given document based on sentence confidence scores determined by the plurality of domain NLCs. Each document confidence score can characterize a relevance of the given document to the respective domain of the plurality of domains. The machine-readable instructions can further cause the processor to generate document similarity data identifying at least one document among documents associated with a corresponding domain of the plurality of domains based on an evaluation of the document confidence scores for the given document and document confidence scores for the documents associated with the corresponding domain.

Another example relates to a system that includes a non-transitory computer-readable medium configured to store machine-readable instructions. The system employs a processor that can be configured to access the non-transitory computer-readable medium and execute the machine-readable instructions. The machine-readable instruction can include a document parser module programmed to retrieve and parse a given document to identify a plurality of sentences of the given document. The machine-readable instruction can further include a plurality of domain NLCs. Each domain NLC can be programmed to classify each identified sentence of the plurality of sentences to determine a sentence confidence score for each identified sentence of the given document. Each domain NLC can be trained based on domain training data associated with a respective domain of a plurality of domains. The machine-readable instructions can further include a similarity determination module programmed to determine a plurality of document confidence scores for the given document based on sentence confidence scores determined by the plurality of domain NLCs. Each document confidence score can characterize a relevance of the given document to the respective domain of the plurality of domains. The similarity determination module can further be programmed to generate document similarity data identifying at least one document among documents associated with a corresponding domain of the plurality of domains based on an evaluation of the document confidence scores for the given document and document confidence scores for the documents associated with the corresponding domain.

Yet another example relates to a method that includes training a plurality of domain NLCs based on domain training data associated with a respective domain of a plurality of different domains. The domain training data for training a corresponding domain NLC of the plurality of NLCs can characterize a domain-specific taxonomy model. The domain-specific taxonomy model can include a plurality of nodes. Each node of the plurality of nodes can represent an intent of at least one sentence from a corresponding document associated with the respective domain of the plurality of domains. The method further includes receiving and parsing a given document to identify each sentence of the given document. The method can further include classifying each identified sentence of the given document via a respective domain NLC of the plurality of domain NLCs to determine a sentence confidence score for each identified sentence of the given document. Each sentence confidence score being provided by each of the plurality of domain NLCs can be associated with a respective node of the plurality nodes of the domain-specific taxonomy model. The method can further include determining a plurality of document confidence scores for the given document based on sentence confidence scores determined by the plurality of domain NLCs. Each document confidence score can characterize a relevance of the given document to the respective domain of the plurality of domains. The method can further include generating document similarity data identifying at least one document among documents associated with a corresponding domain of the plurality of domains based on an evaluation of the document confidence scores for the given document and document confidence scores for the documents associated with the corresponding domain. The method can further include providing the document similarity data to an output device for displaying thereon document location information for the at least one document. The document similarity data includes the document location information.

DETAILED DESCRIPTION

Figure 1:
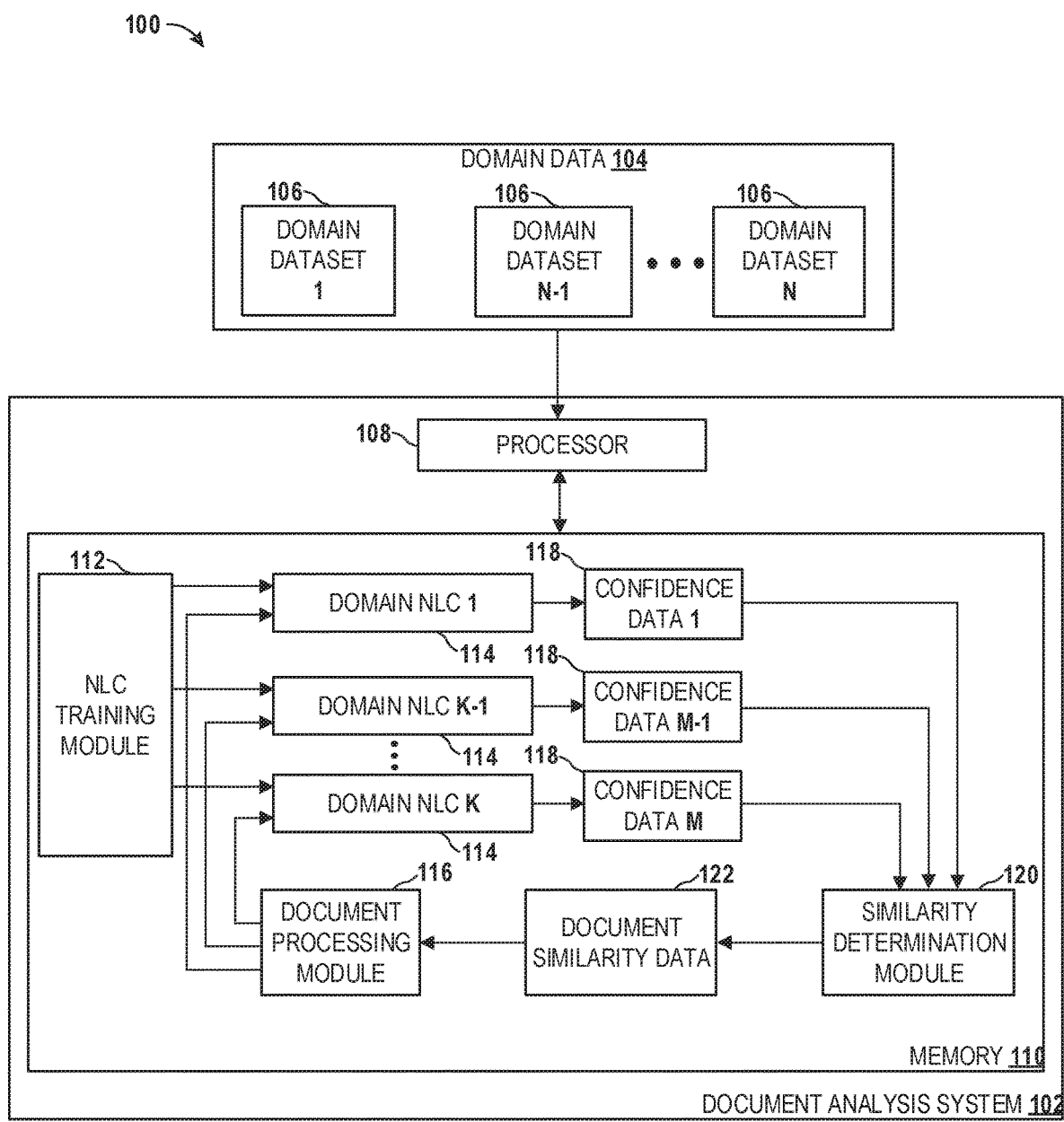
FIG. 1 illustrates an example environment for document similarity matching.

This disclosure relates to systems and methods for document similarity matching. In some examples, a document analysis system can be configured with domain NLCs. The document analysis system includes an NLC training module. The NLC training module can be programmed to train each of the domain NLCs based on domain training data associated with a respective domain of a plurality of domains. The term "domain" as used herein can relate to a textual or document source. The term textual and document and their derivations thereof are used interchangeably herein. The term "text" or "document" as used herein can refer to a string of words (e.g., a sentence or a phrase). Thus, in some examples, as described herein, a document as used herein can refer to strings of words.

The domain training data for training each of the domain NLCs can characterize a domain-specific taxonomy model. The domain-specific taxonomy model for each domain of the plurality of domains can be generated based on documents associated with the respective domain. The domain-specific taxonomy model for each domain can characterize rules and relationships among the documents associated with the respective domain. Thus, the domain-specific taxonomy model for each domain can provide (e.g., define) a classification schema for documents associated with the respective domain. The domain-specific taxonomy model can include a plurality of nodes. Each node of the plurality of nodes of a respective domain-specific taxonomy model can represent an intent of at least one sentence from at least one document associated with the respective domain. Accordingly, each domain-specific taxonomy model associated with a corresponding domain can provide a classification schema for generating the domain training data for each domain.

In some examples, a document processing module of the document analysis system can be programmed to access a document database for document classification in response to training each domain NLC. The document processing module can be programmed to retrieve a given document from the document database. In other examples, the document processing module can be programmed to receive the given document based on user input at an input device. In some examples, the document processing module can be programmed to access the document database to retrieve the given document based on document selection data. The document selection data can be generated based on the user input and identify the document within the document database. The document processing module can be programmed to parse the given document to identify sentences within the given document. Each identified sentence can be sent to each domain NLC for classification. Each domain NLC can be programmed to generate confidence data characterizing a sentence confidence score for each received sentence. The sentence confidence score assigned by each domain NLC can be associated with a respective node of the plurality nodes of the domain-specific taxonomy model.

In some examples, the document analysis system can include a similarity determination module. The similarity determination module can be programmed to determine document confidence scores for the given document based on the sentence confidence scores for the identified sentences provided by each of the domain NLCs. Each document confidence score can characterize a relevance of the given document to the respective domain of the plurality of domains. Thus, each document confidence score can characterize a likeness that the given document is similar to one or more documents associated with the respective domain. The similarity determination module can be programmed to generate document similarity data identifying the at least one document among the documents associated with the respective domain based on an evaluation of the document confidence score for the given document and document confidence scores for the documents associated with the respective domain. The document analysis system can further include an output device. The document processing module can be programmed to provide the document similarity data to the output device for displaying thereon document location information for the document. By way of example, the document location information can correspond to a universal resource locator (URL) for the at least one document.

The document analysis system enables a user to identify similar documents without requiring that the user understand complex natural language understanding (NLU) annotation systems and the building of custom NL models. Moreover, the document analysis system simplifies the gathering of a corpus of ground truths in contrast to existing document similarity matching techniques. This is because the user does not need to manually source documents and locate relevant passages to establish a sufficient training corpus. Additionally, the use of complex NLU annotation tools for building a training model can be avoided, and an understanding of linguistics (e.g., parts of speech) is not required for establishing sentence or word relationships. Furthermore, by creating separate taxonomies for the domains updates to each taxonomy can be made without impacting other taxonomies, and thus requiring re-training each of the domains NLCs. Moreover, the document analysis system utilizes less processing power in contrast to existing document similarity matching techniques that use custom document similarity matching models, which require a greater amount of computer processing power. Processing custom model outputs requires more processing effort (e.g., computing power) than does the use of confidence information (e.g., confidence scores) from the domain NLCs, as described herein.

FIG. 1 illustrates an example environment 100 for document similarity matching. In some examples, a document analysis system 102 can be configured to process domain data 104 associated with a plurality of domains for document similarity matching, as described herein. The document analysis system 102 can be implemented on one or more physical devices (e.g., servers) that can reside in a cloud computing environment, a mobile device, or on a computer, such as a laptop computer, a desktop computer, a tablet computer, a workstation, or the like. In the present example, although the components of the document analysis system 102 are illustrated as being implemented in a single system implementation, in other examples, the different components could be distributed across different systems and communicate, for example, over a wireless and/or wired network.

In some examples, each domain of the plurality of domains can correspond to or be associated with a document source or textual source that can be associated with a corresponding entity, organization, system, device, apparatus, etc. By way of example, the document source can include business activities, legal activities, technical capabilities, etc. The textual source can include computer sources, such as computer logs, textual files, etc. The domain data 104 can include an N number of domain datasets 106, wherein N is an integer greater than or equal to two. Each domain dataset 106 can be associated with a respective domain of the plurality of domains. For example, a first domain dataset 106, which is labeled as "DOMAIN DATASET 1" can be associated with a business activities domain of the plurality of domains, and a second domain dataset 106, which is labeled as "DOMAIN DATASET N−1" can be associated with a technical capabilities domain of the plurality of domains.

In some examples, the document analysis system 102 includes a processor 108 and memory 110. The processor 108 can be configured to receive the domain data 104 and store the domain data 104 in the memory 110. The memory 110 can be representative of a non-volatile data storage, such as a hard disk drive, a solid-state drive, flash memory, etc. In some examples, the memory 110 can include a single discrete article or multiple articles interconnected to allow for data transfer among them, for example, via an associated bus or a local or wide-area. The processor 108 can be configured to process the domain data 104 based on machine-readable instructions stored in the memory 110.

The machine-readable instructions can include an NLC training module 112. The NLC training module 112 can be programmed to train a K number of domain NLCs 114, wherein K is an integer value greater than or equal to two. In some examples, the NLC training module 112 can be programmed to train each of the domain NLCs 114 based on corresponding domain training data. The corresponding domain training data can be generated based on at least some of a respective domain dataset 106 of the domain data 104 associated with a given domain of the plurality of domains. In some examples, at least some of the respective domain dataset 106 can be referred to as domain training data, and the NLC training module 112 can be programmed to train each of the domain NLCs 114 based on the domain training data associated with a corresponding domain of the plurality of domains.

The domain training data for training a corresponding domain NLC 114 can characterize a domain-specific taxonomy model. The domain-specific taxonomy model for each domain can provide a hierarchical classification schema for documents associated with the respective domain. By way of example, each domain-specific taxonomy model can take form as a rooted tree that can include a plurality of nodes (e.g., leaf nodes). Each node of the plurality of nodes can be associated with at least one label. An internal vertex associated with a respective node of the plurality of nodes can represent an intent of at least one sentence of at least one document of the documents associated with the respective domain and can be referred to as a parent node. In some examples, a parent node can have children nodes corresponding to the plurality of nodes, in other examples, the parent node does not have children nodes.

Each label associated with the parent node can provide an intent label (e.g., a corresponding intent class). In some examples, if the internal vertex in the rooted tree represents an intent then corresponding children nodes can correspond to refinements of the intent (e.g., variations in the intent, for example, a variation in the meaning of the intent). Thus, each node of the plurality of nodes can represent an intent of at least one sentence from at least one document associated with the respective domain of the plurality of domains. Accordingly, in some examples, each domain dataset 106 can characterize a respective domain-specific taxonomy model that can provide a classification schema.

In some examples, each domain-specific taxonomy model can be generated by a respective user with knowledge of the documents associated with the respective domain. Thus, each domain-specific taxonomy model can be provided by a user (e.g., a domain subject matter expert (SME)) with an understanding of the meaning and context of the documents (e.g., text within the document) for that domain of the plurality of domains. In some examples, textual summarization techniques can be applied to at least some of the documents associated with the respective domain to summarize at least some of the documents for the creation of a respective domain-specific taxonomy model. For example, extraction-based summarization natural language processing (NLP) techniques or abstraction-based summarization NLP techniques can be employed for domain documentation summarization. These techniques can employ supervised machine learning algorithms (e.g., a binary machine learning classification algorithm) to summarize at least some of the documents associated with the respective domain. Each summarized document (or set of documents) for the respective domain can be employed for the creation of the domain-specific taxonomy model for the respective domain. In other examples, other types of machine learning NLP can be employed for the creation of the domain-specific model taxonomy for the respective domain. For example, artificial intelligence (AI) search tools can be employed to provide access to NLU enrichments that can aide in concept detection, entity extraction and semantic role determination. These tools can be used in the creation of taxonomies.

In some examples, a document processing module 116 of the document analysis system 102 can be programmed to implement document similarity matching to identify relevant documents for a given document in response to the NLC training module 112 training each of the domain NLCs 114. The document processing module 116 can be programmed to receive and parse the given document to identify sentences (e.g., strings of text, phrases, etc.) of the given document. The parsing can include separating each sentence of the given document into a corresponding sentence part.

The document processing module 116 can be programmed to provide each identified sentence to each of domain NLCs 114 to classify each identified sentence to determine a sentence confidence score for each identified sentence of the given document. Each sentence confidence score provided by each of the domain NLCs 114 can be associated with a respective node of the plurality nodes of the domain-specific taxonomy model. Thus, the sentence confidence score provided by each respective domain NLC 114 is a score associated with a corresponding domain of the plurality of domains. Each identified sentence of the given document can be processed by each of the domain NLCs 114 to assign a respective sentence confidence score and stored in the memory 110 as confidence data 118. Thus, the domain NLCs 114 are programmed to provide M number of confidence datasets 118, wherein M is an integer greater than or equal two.

The confidence data 118 provided by each respective domain NLC 114 can characterize sentence confidence scores determined by the respective domain NLC 114 for received sentences from the given document and identify the respective domain. In some examples, the respective domain identified by the confidence data 118 can be identified by a domain monitoring module and stored as part of the confidence data 118. In other examples, the respective NLC 114 can be programmed to provide domain identification data for each processed sentence of the given document and the domain identification data can be provided as part of the confidence data 118.

In some examples, the machine-readable instructions include a similarity determination module 120. The similarity determination module 120 can be programmed to determine a plurality of document confidence scores for the given document based on respective sentence confidence scores determined by corresponding domain NLCs 114. Each document confidence score can characterize a relevance of the given document to the respective domain of the plurality of domains. The similarity determination module 120 can be programmed to aggregate each sentence confidence score determined by a respective domain NLC 114 of the domain NLCs 114 to determine a corresponding document confidence score for the given document. In some examples, the similarity determination module 120 can be programmed to evaluate each document confidence score determined for the given document and identify a greatest document confidence score among document confidence scores for the given document.

The similarity determination module 120 can be programmed to identify the at least one document associated with the respective domain and generate document similarity data 122 identifying the at least one document associated with the respective domain based on an evaluation of the document confidence score for the given document and document confidence scores for the documents associated with the respective domain. The at least one document associated with the respective domain can correspond to a document that is most similar to the given document among documents associated with the respective domain. In some examples, in response to identifying the greatest document confidence score for the given document, the similarity determination module 120 can be programmed to compare the greatest document confidence score for the given document relative to document confidence scores for the documents associated with the respective domain. The documents associated with the respective domain can be stored in a document database. The document database can be stored locally at the memory 110, in some examples, and, in other examples, stored at a remote location (e.g., at a server). The document confidence scores for the documents associated with the respective domain can be determined by the document analysis system 102 in a same or similar manner as the greatest document confidence score for the given document can be determined.

The similarity determination module 120 can be programmed to identify the at least one document associated with the respective domain based on the comparison of the greatest document confidence score for the given document and the document confidence scores associated with the documents associated with the respective domain. In some examples, the similarity determination module 120 can be programmed to identify the at least one document associated with the respective domain in response to determining that a document confidence score for the at least one document is within a given value (e.g., range, percentage, etc.) of the greatest document confidence score for the given document. Thus, the similarity determination module 120 can be programmed to compare differences in document confidence score between the greatest document confidence score for the given document and the document confidence scores for the documents associated with the respective domain relative to a difference threshold to identify the at least one document associated with the respective domain.

In some examples, each document confidence score determined by the similarity determination module 120 can be representative of a document confidence score feature vector. In these examples, the similarity determination module 120 can be programmed to receive a plurality of feature vectors for the given document. A respective feature vector of the plurality of feature vectors can correspond to the greatest document confidence score feature vector. Each feature vector of the plurality of feature vectors can characterize a relevance of documents associated with the respective domain to the given document. Each feature vector can be been provided by a corresponding document relevance algorithm (e.g., a given feature vector can be provided based on a best matching algorithm, such as Okapi BM25). Thus, each feature vector can be representative of a value (e.g., an integer value, a percentage value, etc.) that can provide an indication of relevance of the documents associated with the respective domain to the given document.

The similarity determination module 120 can be programmed to score the documents associated with the respective domain relative to the given document to generate a set of scores for the given document corresponding to the plurality of feature score vectors. The similarity determination module 120 can be programmed to rank the documents associated with the respective domain according to a corresponding score of the set of scores to provide a ranked document list. The ranked document list can identify a subset of documents associated with the respective domain that can include or correspond to the at least one other document that is most similar to the given document. The document similarity data 122 can include the ranked document list. In some examples, the similarity determination module 120 can be programmed to weight each score assigned to each document associated with the respective domain to generate a set of weighted scores for the given document. In these examples, the set of weighted confidence scores can correspond to the set of scores for the given document, as described above.

In some examples, the document processing module 116 can be programmed to receive the document similarity data 122. The document processing module 116 can be programmed to provide the document similarity data 122 to an output device for displaying thereon document location information for the at least one document associated with the respective domain. In some examples, the document processing module 116 can be programmed to include the document location information as part of the document similarity data 122. The document location information can identify a location for the at least document associated with the respective domain that is most similar to the given document. In some examples, the document location information is a respective URL for the at least one document.

By training each domain NLC 114 based on respective domain training data (e.g., respective domain dataset 106) improves overall quality of textual similarity matching by reducing false positives matches. A document that is most similar to other documents associated with the respective domain can be identified at a greater accuracy rate by employing the document analysis system 102 in contrast to existing document similarity matching techniques. This is because the document analysis system 102 processes each sentence of the given document for similarity matching through each of the domain NLCs 114 that has been trained based on different domain training data. Thus, by processing each sentence of the document through each of the different domain trained domain NLCs 114, the respective domain with which the given document is most likely associated with (e.g., belongs to) can be readily identified from the other domains of the plurality of domains.

The document analysis system 102 enables a user to identify similar documents without requiring that the user understand complex NLU annotation systems and the building of custom NL models. Moreover, the document analysis system 102 simplifies the gathering of a corpus of ground truths in contrast to existing document similarity matching techniques. This is because the user does not need to manually source documents and locate relevant passages to establish a sufficient training corpus. Additionally, the use of complex NLU annotation tools for building a training model can be avoided, and an understanding of linguistics (e.g., parts of speech) is not required for establishing sentence or word relationships. Furthermore, by creating separate taxonomies for the plurality of domains updates to each taxonomy can be made without impacting other taxonomies, and thus requiring re-training each of the domains NLCs 114. Moreover, the document analysis system 102 utilizes less processing power in contrast to existing document similarity matching techniques that use custom document similarity matching models, which require a greater amount of computer processing power.

Figure 2:
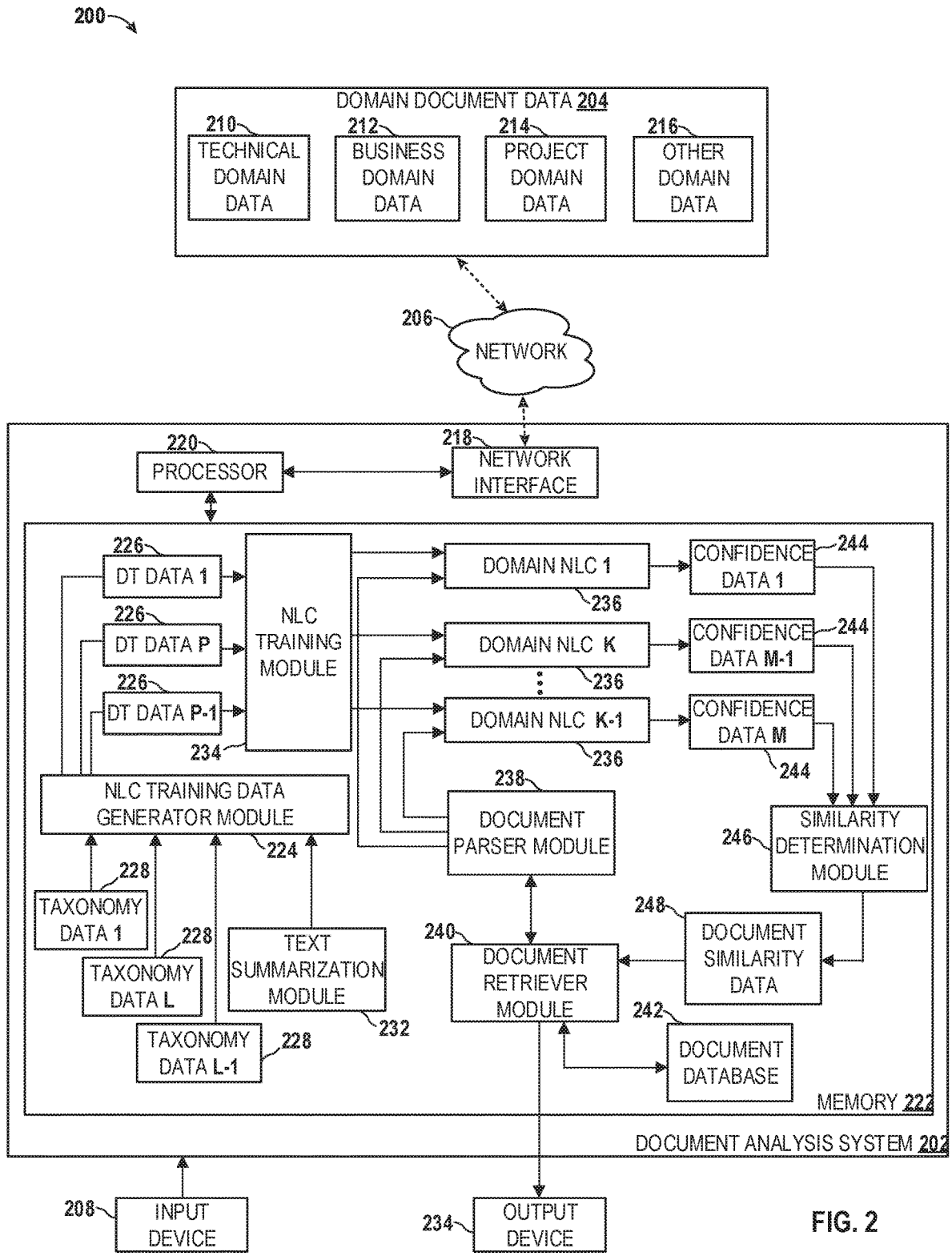
FIG. 2 illustrates an example of a document analysis system.

FIG. 2 illustrates an example of a document analysis system 202. The document analysis system 202 can correspond to the document analysis system 102, as illustrated in FIG. 1. Therefore, reference may be made to the example of FIG. 1 in the following description of the example of FIG. 2. By way of example, the document analysis system 202 can be configured to process domain document data 204 associated with an organization (e.g., a utility or energy company). In other examples, the document analysis system 200 can be configured to process domain data associated with a different document domain source, such as a different type of organization, a computer system, etc. Thus, the examples herein should not be construed and/or limited to only processing of the domain document data 204 as described herein. In some examples, the domain document data 204 can correspond to the domain data 104, as illustrated in FIG. 1.

In some examples, the domain document data 204 can be received at the document analysis system 202 over a network 206. The network 206 can include a wired network, a wireless network, and a combination thereof. In some examples, the domain document data 204 can be provided by an input device 208. The input device 208 can be any type of device capable of supporting a communications interface to the document analysis system 202. Exemplary input devices 208 can include a server, a mobile device, a mobile computer, a tablet, etc. In some examples, the input device 208 is a gesture device, a mouse, a keyboard, etc. The input device 208 can be connected to the document analysis system 202 using a provided network (e.g., via common internet protocols), such as a wired or wireless network. In some examples, the provided network can correspond to the network 206, as illustrated in FIG. 2. By way of further example, the provided network can include an Internet, an intranet, a WiFi network, a WiMAX network, a mobile telephone network, and combinations thereof. The input device 208 can be configured to enable a user to interact with the document analysis system 202 via a local interface (e.g., a web browser, a software application, etc.). For example, the user can employ the input device 208 to provide the domain document data 204.

In some examples, the domain document data 204 includes a plurality of document datasets associated with the organization. For example, the domain document data 204 can include technical domain data 210, business domain data 212, project domain data 214, and other domain data 216. The technical data 210 can characterize technical documents relating to technical capabilities associated with the organization. Thus, the technical data 210 can characterize technical documents for a project, personnel (e.g., technical skillset of an employee), etc. The business data 212 can characterize business documents (e.g., contracts, accounting records, performance records, sale records, etc.) associated with business functions of the organization. The project data 214 can characterize documents associated with undertakings or objectives of the organization. Thus, the project data 214 can characterize project documents associated with a business project, an engineering project, a sales project, etc. The other data 216 can characterize other types of documents associated with the organization. By way of example, the other data 216 can correspond to human resource data and thus characterize human resource documents (e.g., an employee handbook, a job description, timesheets, performance appraisals, arbitration agreements, confidentiality agreements, etc.).

In some examples, the domain document data 204 can be received at a network interface 218 of the document analysis system 202. The network interface 218 can be configured to provide the domain document data 204 to a processor 220 for NLC domain training for document similarity matching. The processor 220 can be configured to store the domain document data 204 in memory 222 of the document analysis system 202. The memory 222 can be representative of a non-volatile data storage, such as a hard disk drive, a solid-state drive, flash memory, etc. In some examples, the memory 222 can include a single discrete article or multiple articles interconnected to allow for data transfer among them, for example, via an associated bus or a local or wide-area.

The processor 220 can be configured to process the domain document data 204 based on machine-readable instructions stored in the memory 222. The machine-readable instructions include an NLC training data generator module 224. The NLC training data generator module 224 can be programmed to generate a P number of instances of domain training data 226, wherein P is an integer value greater than or equal to two. Each instance of domain training data 226 can be generated based on respective taxonomy data 228. There can be an L number of taxonomy data 228, wherein L is an integer value greater than or equal to two. The taxonomy data 228 for generating respective domain training data 226 can characterize a domain-specific taxonomy model. The domain-specific taxonomy model for each domain can provide a hierarchical classification schema for documents associated with the respective domain. For example, if the domain is a technical domain, the domain-specific taxonomy model can characterize rules and relationships among technical documents including sentences of the technical documents.

Each domain-specific taxonomy model can define a tree with a plurality of nodes. Each node of the plurality of nodes can be associated with at least one label. An internal vertex associated with a corresponding node of the plurality of nodes can represent an intent and can be referred to as a parent node. Each label associated with the parent node can provide an intent label (e.g., a corresponding intent class). In some examples, if the internal vertex in the tree represents a technical intent then corresponding children nodes can correspond to refinements of the technical intent. Each node of the plurality of nodes can represent an intent of at least one sentence from at least one document associated with a corresponding domain of the plurality of domains. Accordingly, the taxonomy data 228 for each domain can characterize a domain-specific taxonomy model that can provide a classification schema for documents associated with the respective domain.

In some examples, each domain-specific taxonomy model can be provided based at least in part on user input at the input device 208 with knowledge of the documents associated with the respective domain. The respective user can employ the input device 208 to analyze and evaluate the domain document data 204 to understand the meaning and context of documents (and thus respective sentences therein) associated with each respective domain of the plurality of domains. The NLC training data generator module 224 can be programmed to generate a graphical user interface (GUI) to facilitate the analysis and evaluation of the domain document data 204 for the creation of at least a portion of the domain-specific taxonomy model, and thereby respective taxonomy data 228 for each domain. The GUI can be provided to an output device 230 (e.g., a display) for displaying thereon relevant domain information for the creation of at least a portion of the domain-specific taxonomy model.

In some examples, a text summarization module 232 can be programmed receive at least a portion of domain data (e.g., the technical domain data 210, the business domain data 212, the project domain data 214, and the other domain data 216) and apply machine learning textual summarization techniques (e.g., extraction-based and/or abstraction-based techniques) to the portion of the domain data to summarize at least one document or respective sections of the at least one document. The text summarization module 232 can be programmed to provide textual summarization data to the NLC training data generator module 224. The NLC training data generator module 224 can be programmed to update the GUI on the output device 230 to display the textual summarization data, which the respective user (e.g., a domain SME) can employ for the creation of at least a portion of the domain-specific taxonomy model.

The NLC training data generator module 224 can be programmed to generate respective domain training data 226 based on corresponding taxonomy data 228. The machine-readable instructions can further include an NLC training module 234, and a K number of domain NLCs 236, wherein K is an integer value greater than or equal to two. The NLC training module 234 can correspond to the NLC training module 112 and the domain NLCs 236 can correspond to the domain NLCs 114, as illustrated in FIG. 1. The NLC training module 234 can be programmed to train the domain NLCs 236 based on the respective domain training data 226 associated with a corresponding domain of the plurality of domains.

In some examples, the machine-readable instructions include a document parser module 238 and a document retriever module 240. In some examples, the document parser module 238 and the document retriever module 240 can collectively define a portion of a document processing module, such as the document processing module 116, as illustrated in FIG. 1. In some examples, the document retriever module 240 can be programmed to communicate with a document database 242. Although FIG. 2 illustrates the document database 242 as being stored locally (e.g., at the memory 222), in other examples, the document database 242 can be stored at a remote location (e.g., on a server) that the document retriever module 240 can be programmed to access via the network 206 by employing the network interface 218.

In some examples, the document retriever module 240 can be programmed to retrieve the given document from the document database 242. In other examples, the document retriever module 240 can be programmed to receive the given document, e.g., based on user input at the input device 208. The document retriever module 240 can be programmed to provide the given document to the document parser module 238. The document parser module 238 can be programmed to parse the given document to identify sentences of the given document. The document parser module 238 can be programmed to provide each identified sentence to each of the domain NLCs 236 to classify each identified sentence to determine a sentence confidence score for each identified sentence of the given document.

Each sentence confidence score that can be provided by each of the domain NLCs 236 can be associated with a respective node of the plurality nodes of a corresponding domain-specific taxonomy model. Thus, the sentence confidence score provided by each respective domain NLC 236 is a score that can be associated with a corresponding node (e.g., and thus class intent label) of the domain-specific taxonomy model. Each identified sentence of the given document can be processed by each of the domain NLCs 236 to assign a respective sentence confidence score and stored in the memory 222 as confidence data 244. Thus, the domain NLCs 236 can be programmed to provide M number of instances of the confidence data 244, wherein M is an integer value that is greater than or equal two. The confidence data 244 provided by each respective domain NLC 236 can characterize sentence confidence scores determined by the respective domain NLC 236 and identify the respective domain.

In some examples, the machine-readable instructions include a similarity determination module 246. The similarity determination module 246 can correspond to the similarity determination module 120, as illustrated in FIG. 1. The similarity determination module 246 can be programmed to determine a plurality of document confidence scores for the given document based on respective sentence confidence scores determined by corresponding domain NLCs 236. Each document confidence score can characterize a relevance of the given document to the respective domain of the plurality of domains. The similarity determination module 246 can be programmed to aggregate each sentence confidence score determined by a respective domain NLC 236 of the domain NLCs 236 to determine a corresponding document confidence score for the given document. In some examples, the similarity determination module 246 can be programmed to evaluate each document confidence score determined for the given document and identify a greatest document confidence score among document confidence scores for the given document.

The similarity determination module 246 can be programmed to identify the at least one document associated with the respective domain and generate document similarity data 248 based on an evaluation of the greatest document confidence score for the given document and document confidence scores for the documents associated with the respective domain. The at least one document associated with the respective domain can correspond to a document that is most similar to the given document among the documents associated with the respective domain. In some examples, in response to identifying the greatest document confidence score for the given document, the similarity determination module 246 can be programmed to compare the greatest document confidence score for the given document relative to document confidence scores for documents associated with the respective domain. The documents associated with the respective domain can be stored in the document database 242. The document confidence scores for the documents associated with the respective domain can be determined by the document analysis system 202 in a same or similar manner as the greatest document confidence score for the given document can be determined.

The similarity determination module 246 can be programmed to identify the at least one document associated with the respective domain based on the comparison of the greatest document confidence score for the given document and the document confidence scores associated with the documents associated with the respective domain. In some examples, the similarity determination module 246 can be programmed to identify the at least one document associated with the respective domain in response to determining that a document confidence score for the at least one document is within a given value (e.g., range, percentage, etc.) of the greatest document confidence score.

In some examples, the document retriever module 240 can be programmed to receive the document similarity data 248. The document retriever module 240 can be programmed to provide the document similarity data 248 to the output device 230 for displaying thereon document location information for the at least one document. In some examples, the document retriever module 240 can be programmed to include document location information as part of the document similarity data 248. The document location information can identify a location (e.g., in the document database 242, in some examples) of the at least one document associated with the respective domain that is most similar to the given document.

By training each domain NLC 236 based on relevant domain training data (e.g., respective domain data 210, 212, 214, or 216) improves overall quality of textual similarity matching by reducing false positives matches. A document that is most similar to other documents associated with the respective domain can be identified at a greater accuracy rate by employing the document analysis system 202 in contrast to existing document similarity matching techniques. This is because the document analysis system 202 processes each sentence of the given document through each of the domain NLCs 236 that has been trained based on different domain training data. By processing each sentence of the given document through each of the different trained domain NLCs 236, the respective domain with which the given document is most likely associated with (e.g., belongs to) can be readily identified from the other domains of the plurality of domains.

The document analysis system 202 enables a user to identify similar documents without requiring that the user understand complex NLU annotation systems and the building of custom NL models. Moreover, the document analysis system 202 simplifies the gathering of a corpus of ground truths in contrast to existing document similarity matching techniques. This is because the user does not need to manually source documents and locate relevant passages to establish a sufficient training corpus. Additionally, the use of complex NLU annotation tools for building a training model can be avoided, and an understanding of linguistics (e.g., parts of speech) is not required for establishing sentence or word relationships. Furthermore, by creating separate taxonomies for the plurality of domains updates to each taxonomy can be made without impacting other taxonomies, and thus requiring re-training each of the domains NLCs 236. Moreover, the document analysis system 202 utilizes less processing power in contrast to existing document similarity matching techniques that use custom document similarity matching models, which require a greater amount of computer processing power.

Figure 3:
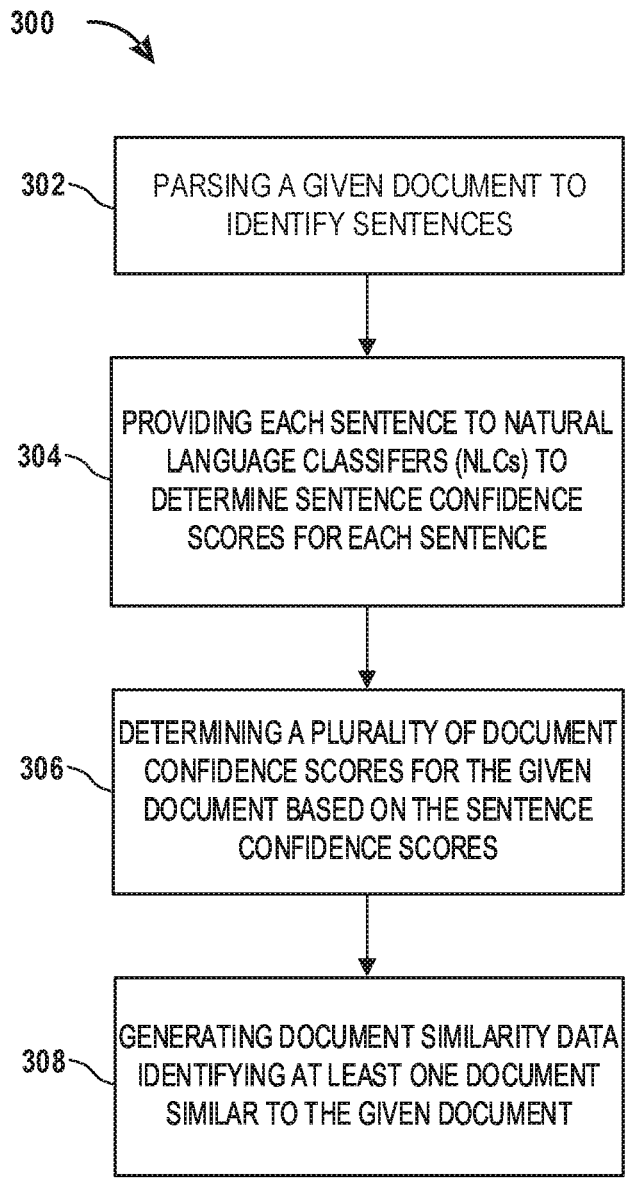
FIG. 3 is a flow diagram illustrating an example of a method for document similarity matching.
Figure 4:
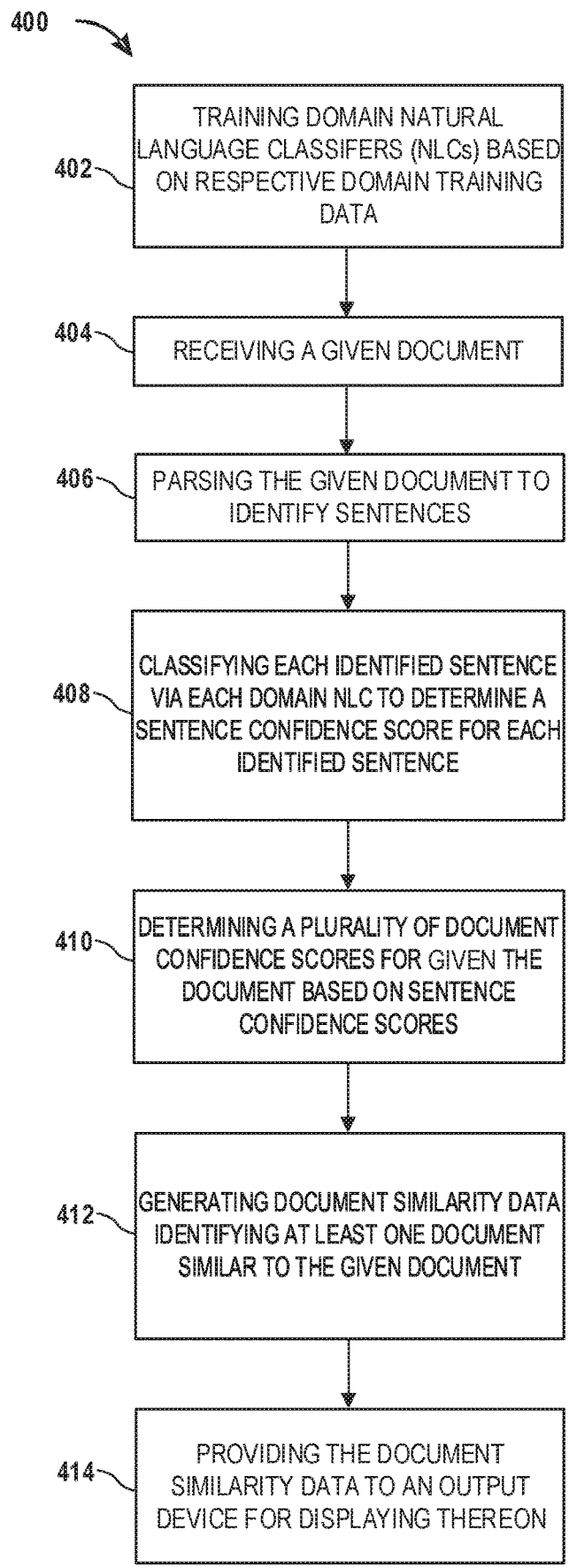
FIG. 4 is a flow diagram illustrating an example of another method for document similarity matching.

In view of the foregoing structural and functional features described above, example methods will be better appreciated with reference to FIG. 3 and FIG. 4. While, for purposes of simplicity of explanation, the example methods of FIG. 3 and FIG. 4 are shown and described as executing serially, it is to be understood and appreciated that the example methods are not limited by the illustrated order, as some actions could in other examples occur in different orders, multiple times and/or concurrently from that shown and described herein.

FIG. 3 is a flow diagram illustrating an example of a method 300 for document similarity matching. The method 300 can be implemented by a document analysis system, such as the document analysis system 102 of FIG. 1 or the document analysis system 200 of FIG. 2. Therefore, reference may be made to the example of FIG. 1 and FIG. 2 in the following description of the example of FIG. 3. The method 300 can begin at 302 parsing (e.g., via a document parser module 238, as illustrated in FIG. 2) a given document to identify sentences (e.g., respective strings of texts) of the given document. At 304 the method 300 includes providing each identified sentence to each of a plurality of domain NLCs to classify each identified sentence to determine a sentence confidence score for each identified sentence of the given document. The plurality of domain NLCs can correspond to the domain NLCs 114, as illustrated in FIG. 1 or the domain NLCs 236, as illustrated in FIG. 2. Each domain NLC can be trained based on domain training data (e.g., the domain training data 226, as illustrated in FIG. 2) associated with a respective domain of a plurality of domains.

At 306 the method 300 includes determining (e.g., via a similarity determination module 120, as illustrated in FIG. 1 or the similarity determination module 246, as illustrated in FIG. 2) a plurality of document confidence scores for the given document based on sentence confidence scores determined by the plurality of domain NLCs. Each document confidence score can characterize a relevance of the given document to the respective domain of the plurality of domains. At 308 the method 300 includes generating document similarity data (e.g., the document similarity data 122, as illustrated in FIG. 1 or the document similarity data 248, as illustrated in FIG. 2) identifying at least one document among documents associated with a corresponding domain of the plurality of domains based on an evaluation of the document confidence scores for the given document and document confidence scores for the documents associated with the corresponding domain.

FIG. 4 is a flow diagram illustrating an example of another method 400 for document similarity matching. The method 400 can be implemented by a document analysis system, such as the document analysis system 102 of FIG. 1 or the document analysis system 202 of FIG. 2. Therefore, reference may be made to the example of FIG. 1 and FIG. 2 in the following description of the example of FIG. 4. The method 400 can begin at 402 by training a plurality of domain NLCs based on domain training data (e.g., the domain training data 226, as illustrated in FIG. 2) associated with a respective domain of a plurality of different domains. The plurality of domain NLCs can correspond to the domain NLCs 114, as illustrated in FIG. 1 or the domain NLCs 236, as illustrated in FIG. 2.

The domain training data for training a corresponding domain NLC can characterize a domain-specific taxonomy model that can include a plurality of nodes. Each node of the plurality of nodes can represent an intent of at least one sentence from a corresponding document associated with the respective domain of the plurality of domains. At 404, the method 400 includes receiving (e.g., at a document retriever module 240, as illustrated in FIG. 2) a given document. At 406, the method 400 includes parsing (e.g., via the document parser module 238, as illustrated in FIG. 2) the given document to identify each sentence of the given document.

At 408, the method 400 includes classifying each identified sentence of the given document via each domain NLC of the plurality of domain NLCs to determine a sentence confidence score for each identified sentence of the given document. Each sentence confidence score being provided by each of the plurality of domain NLCs can be associated with a respective node of the plurality nodes of the domain-specific taxonomy model. At 410, the method 400 includes determining (e.g., via a similarity determination module 120, as illustrated in FIG. 1 or the similarity determination module 246, as illustrated in FIG. 2) a plurality of document confidence scores for the given document based on sentence confidence scores determined by the plurality of domain NLCs. Each document confidence score can characterize a relevance of the given document to the respective domain of the plurality of domains.

The method 400 at 412 can further include generating (e.g., via the similarity determination module 120, as illustrated in FIG. 1 or the similarity determination module 246, as illustrated in FIG. 2) document similarity data (e.g., the document similarity data 118, as illustrated in FIG. 1 or the document similarity data 248, as illustrated in FIG. 2) identifying at least one document among documents associated with a corresponding domain of the plurality of domains based on an evaluation of the document confidence scores for the given document and document confidence scores for the documents associated with the corresponding domain. At 414, the method 400 includes providing (e.g., via the document processing module 116, as illustrated in FIG. 1 or the document retriever module 240, as illustrated in FIG. 2) the document similarity data to an output device (e.g., the output device 230, as illustrated in FIG. 2) for displaying thereon document location information for the at least one document.

In view of the foregoing structural and functional description, those skilled in the art will appreciate that portions of the systems and methods disclosed herein may be embodied as a method, data processing system, or computer program product, such as a non-transitory computer-readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer-readable program code on the medium. Any suitable computer-readable medium may be utilized including, but not limited to, static and dynamic storage devices, hard disks, solid-state storage devices, optical storage devices, and magnetic storage devices.

What have been described above are examples. It is, of course, not possible to describe every conceivable combination of structures, components, or methods, but one of ordinary skill in the art will recognize that many further combinations and permutations are possible. Accordingly, the present disclosure is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory machine-readable medium having machine-readable instructions executable by a processor, the machine-readable instructions in response to being executed by the processor causing the processor to:

parse a given document to identify sentences of the given document;

provide each identified sentence to each of a plurality of domain natural language classifiers (NLCs) to classify each identified sentence to determine a sentence confidence score for each identified sentence of the given document, wherein each domain NLC is trained based on domain training data associated with a respective domain of a plurality of domains;

determine a plurality of document confidence scores for the given document based on sentence confidence scores determined by the plurality of domain NLCs, each document confidence score characterizing a relevance of the given document to the respective domain of the plurality of domains;

evaluate the plurality of document confidence scores for the given document to identify a greatest document confidence score among the plurality of document confidence scores for the given document;

generate document similarity data identifying at least one document among documents associated with a corresponding domain of the plurality of domains based on an evaluation of the document confidence scores for the given document and document confidence scores for the documents associated with the corresponding domain; and compare differences in document confidence score between the greatest document confidence score for the given document and the document confidence scores for the documents associated with the corresponding domain to a difference threshold to identify the at least one document associated with the corresponding domain.

2. The non-transitory machine-readable medium of claim 1, wherein the machine-readable instructions further cause the processor to provide the document similarity data to an output device for displaying thereon document location information for the at least one document, wherein the document similarity data includes the document location information.

3. The non-transitory machine-readable medium of claim 2, wherein the machine-readable instructions further cause the processor to:

identify the at least one document associated with the corresponding domain based on the evaluation of the greatest document confidence score for the given document and the document confidence scores for the documents associated with the corresponding domain.

4. The non-transitory machine-readable medium of claim 3, wherein the machine-readable instructions further cause the processor to:

compare the greatest document confidence score for the given document relative to the document confidence scores for the documents associated with the corresponding domain; and identify the at least one document associated with the corresponding domain in response to determining that a document confidence score for the at least one document is within a given value of the greatest document confidence score for the given document, the document similarity data being generated in response to identifying the at least one document.

5. The non-transitory machine-readable medium of claim 3, wherein the machine-readable instructions further cause the processor to identify the at least one document associated with the corresponding domain in response to determining that a given difference in document confidence score between the greatest document confidence score for the given document and the document confidence score for the at least one document is within a given value of the difference threshold.

6. The non-transitory machine-readable medium of claim 5, wherein the machine-readable instructions further cause the processor to access a document database comprising a plurality of documents to retrieve the at least one document in response to a user input at the input device.

7. The non-transitory machine-readable medium of claim 6, wherein the machine-readable instructions further cause the processor to receive a document query request based on the user input at the input device, the document query request comprising the given document.

8. The non-transitory machine-readable medium of claim 7, wherein the domain training data for training a corresponding domain NLC characterizes a domain-specific taxonomy model comprising a plurality of nodes, each node of the plurality of nodes representing an intent of at least one sentence from a corresponding document associated with the respective domain of the plurality of domains, wherein each sentence confidence score that is provided by each of the plurality of domain NLCs is associated with a respective node of the plurality nodes of a respective domain-specific taxonomy model.

9. The non-transitory machine-readable medium of claim 8, wherein the machine-readable instructions further cause the processor to aggregate each sentence confidence score determined by a respective domain NLC of the plurality of domain NLCs to determine a corresponding document confidence score for the given document.

10. The non-transitory machine-readable medium of claim 9, wherein the machine-readable instructions further cause the processor to train each of the domain NLCs based on the domain training data associated with the respective domain of the plurality of domains.

11. The non-transitory machine-readable medium of claim 10, wherein the plurality of domains are associated with an organization, each domain of the plurality of domains being associated with a respective document source of a plurality of document sources of the organization.

12. The non-transitory machine-readable medium of claim 11, wherein the plurality of document sources comprises a technical document source, a sales document source, a financial document source, a human resource document source, a marketing document source, a production document source, and a research and development document source.

13. A system comprising:
a non-transitory computer-readable medium configured to store machine-readable instructions;
a processor configured to access the non-transitory computer-readable medium and execute the machine-readable instructions, the machine-readable instructions comprising:
a document parser module programmed to retrieve and parse a given document to identify a plurality of sentences of the given document;
a plurality of domain natural language classifiers (NLCs), each domain NLC being programmed to classify each identified sentence to determine a sentence confidence score for each identified sentence of the given document, wherein each domain NLC is trained based on domain training data associated with a respective domain of a plurality of domains; and
a similarity determination module programmed to:
determine a plurality of document confidence scores for the given document based on sentence confidence scores determined by the plurality of domain NLCs, each document confidence score characterizing a relevance of the given document to the respective domain of the plurality of domains;
evaluate the plurality of document confidence scores for the given document to identify a greatest document confidence score among the plurality of document confidence scores for the given document;
generate document similarity data identifying at least one document among documents associated with a corresponding domain of the plurality of domains based on an evaluation of the document confidence scores for the given document and document confidence scores for the documents associated with the corresponding domain; and
compare differences in document confidence score between the greatest document confidence score for the given document and the document confidence scores for the documents associated with the corresponding domain to a difference threshold to identify the at least one document associated with the corresponding domain.

14. The system of claim 13, wherein the domain training data for training a corresponding domain NLC characterizes a domain-specific taxonomy model comprising a plurality of nodes, each node of the plurality of nodes representing an intent of at least one sentence from a corresponding document associated with the respective domain of the plurality of domains, wherein each sentence confidence score that is provided by each of the plurality of domain NLCs is associated with a respective node of the plurality nodes of a respective domain-specific taxonomy model.

15. The system of claim 14, wherein the machine-readable instructions further comprise a document retriever module programmed to:
provide the document similarity data to an output device for displaying thereon document location information for the at least one document, wherein the document similarity data includes the document location information; and
access a document database comprising a plurality of documents to retrieve the at least one document from the document database based on a user input at an input device in response to the providing the document similarity data to the output device, the at least one retrieved document being displayed on the output device.

16. The system of claim 15, wherein the similarity determination module is programmed to:
   identify the at least one document associated with the corresponding domain based on the evaluation of the greatest document confidence score for the given document and the document confidence scores for the documents associated with the corresponding domain.

17. The system of claim 15, wherein the similarity determination module is programmed to:
   compare the greatest document confidence score for the given document relative to the document confidence scores for the documents associated with the corresponding domain; and
   identify the at least one document associated with the corresponding domain in response to determining that a document confidence score for the at least one document is within a given value of the greatest document confidence score for the given document, the document similarity data being generated in response to identifying the at least one document.

18. A method comprising:
   training a plurality of domain natural language classifiers (NCLs) based on domain training data associated with a respective domain of a plurality of different domains, wherein the domain training data for training a corresponding domain NLC of the plurality of NCLs characterizes a domain-specific taxonomy model comprising a plurality of nodes, each node of the plurality of nodes representing an intent of at least one sentence from a corresponding document associated with the respective domain of the plurality of domains;
   receiving and parsing a given document to identify each sentence of the given document;
   classifying each identified sentence of the given document via each domain NLC of the plurality of domain NLCs to determine a sentence confidence score for each identified sentence of the given document, each sentence confidence score being provided by each of the plurality of domain NLCs being associated with a respective node of the plurality nodes of the domain-specific taxonomy model;
   determining a plurality of document confidence scores for the document based on sentence confidence scores determined by the plurality of domain NLCs, each document confidence score characterizing a relevance of the given document to the respective domain of the plurality of domains; and
   generating document similarity data identifying at least one document among documents associated with a corresponding domain of the plurality of domains based on an evaluation of the document confidence scores for the given document and document confidence scores for the documents associated with the corresponding domain; and
   providing the document similarity data to an output device for displaying thereon document location information for the at least one document, wherein the document similarity result data includes the document location information.

19. The method of claim 18, further comprising:
   evaluating the plurality of document confidence scores for the given document to identify a greatest document confidence score among the plurality of document confidence scores for the given document;
   identifying the at least one document associated with the corresponding domain based on the evaluation of the greatest document confidence score for the given document and the document confidence scores for the documents associated with the corresponding domain, wherein the document similarity data is provided in response to identifying the at least one document; and
   accessing a document database comprising a plurality of documents to retrieve the at least one document from the document database based on a user input at an input device in response to the providing the document similarity data to the output device, the at least one retrieved document being displayed on the output device.

* * * * *